United States Patent
Yamadai et al.

[15] 3,673,631
[45] July 4, 1972

[54] WINDSHIELD WIPERS FOR VEHICLES

[72] Inventors: Tadaaki Yamadai, Yokosuka; Tadao Kushida, Nakagun; Hiroshi Konishi, Fujisawa; Yoshinari Inaba, Machida, all of Japan

[73] Assignees: Nissan Motor Company, Limited, Yokohama, Japan; Ichikoh Industries Limited, Tokyo, Japan

[22] Filed: June 18, 1970

[21] Appl. No.: 47,476

[30] Foreign Application Priority Data

June 27, 1969 Japan..................................44/60375
Oct. 3, 1969 Japan..................................44/94144

[52] U.S. Cl.......................................................15/250.42
[51] Int. Cl........................................................B60s 1/38
[58] Field of Search..................................15/250.36, 250.42

[56] References Cited

UNITED STATES PATENTS 3,541,629  11/1970  Quinlan et al. ..................15/250.42

FOREIGN PATENTS OR APPLICATIONS 882,780  11/1961  Great Britain....................15/250.42
1,040,936  9/1966  Great Britain....................15/250.42

*Primary Examiner*—Peter Feldman
*Attorney*—John Lezdey

[57] ABSTRACT

A windshield wiper for wiping a windshield of a vehicle, wherein improvements are made on the wiper blade so that the lifting force which is imparted to the wiper blade when the vehicle is driven at a high speed is significantly reduced by reducing the overall width of the wiper blade or by producing a force counteracting the lifting force through provision of a plurality of holes in the leeward side wall of each of the wiper blade supporting elements or stays each of which is configured in a shape of an inverted letter V in cross section.

11 Claims, 12 Drawing Figures

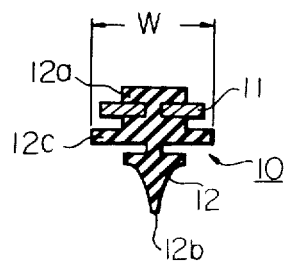
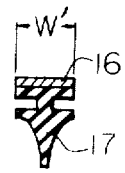
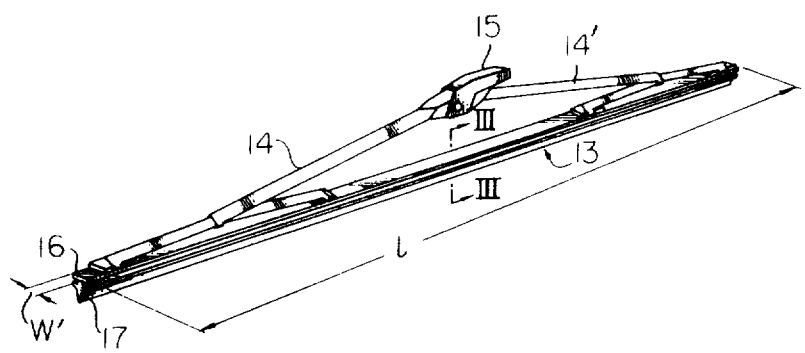
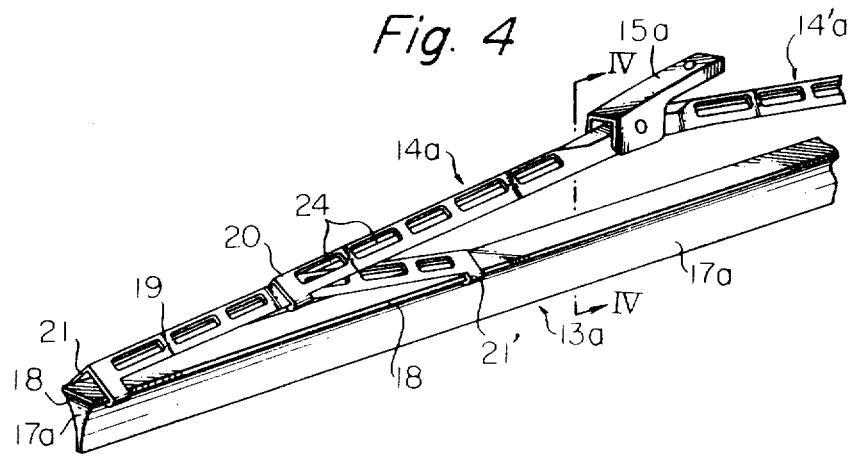

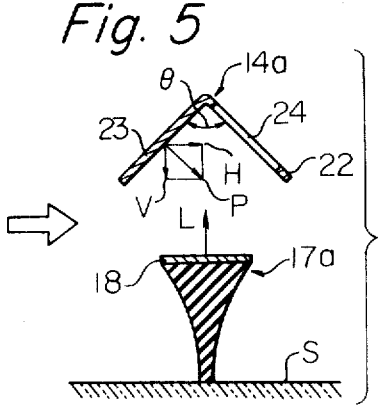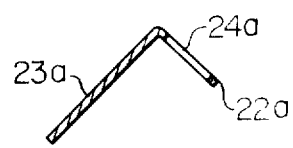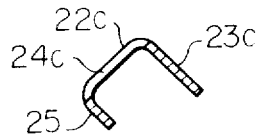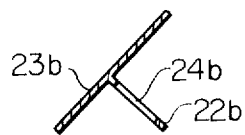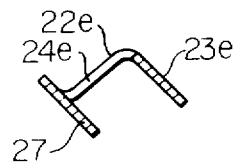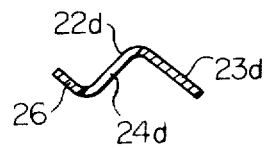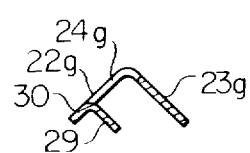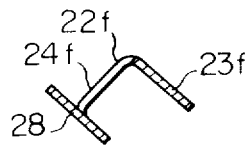

WINDSHIELD WIPERS FOR VEHICLES

This invention relates to windshield wipers for vehicles such as automobiles, boats or ships, aircraft, and railroad cars having a transparent windshield or screen providing an outside vision to the vehicle occupants.

The windshield wiper, as used on the vehicles, wipes off the drips and splashes of water on the surface of the windshield, which drops or splashes of water would otherwise be obstructs to the clear view by the vehicle occupants.

A drawback is encountered by the conventional windshield wipers in that, as the vehicle runs at a relatively high speed, say, at a speed higher than about 100 km/hr., a lifting force results from a rapid stream of air as caused by the very movement of the vehicle and acts upon the wiper blade of the windshield wiper. When the lifting force overcomes the pressure at which the windshield wiper is pressed against the windshield by a spring action, then the windshield wiper tends to float over the surface of the windshield and is no longer able to wipe off the drops and splashes of water on the windshield. To eliminate such a drawback, it is presently proposed and practised to mount a fin on a stay or wiper blade holder which is usually provided to hold a rubber element or squeegee in direct contact with the windshield. A force directed toward the surface of the windshield is developed in the wiper blade by means of the fin thus arranged, whereby the lifting force exercised on the wiper blade is cancelled partially or totally. The provision of such a fin, however, is reflected by the limitation in the area of the vision through the windshield, increased drag on the wiper blade, and degraded appearance of the wiper blade which is keenly sharpened at its leading edge. What is more important, the force acting against the lifting force is only deficient unless that area of the fin which confronts the stream of air is large enough.

An object of the invention is, therefore, to provide windshield wipers which are improved to prevent the wiper blade from floating over the windshield when the vehicle runs at a high speed.

Another object is to provide a windshield wiper adapted to reduce the force which acts upon the wiper blade and urges the wiper blade to float over the surface of the windshield.

Still another object is to provide a windshield wiper having means adapted not only to reduce the lifting force acting upon the wiper blade but to develop a force which may cancel and nullify the lifting force.

In the drawings:

FIG. 1 is a cross sectional view of a wiper blade of a windshield wiper of known type;

FIG. 2 is a perspective view of a first embodiment of the wiper blade according to the invention;

FIG. 3 is a section on line III—III of FIG. 2;

FIG. 4 is similar to FIG. 2 but shows a second embodiment of the wiper blade;

FIG. 5 is a section on line IV—IV of FIG. 4; and

FIGS. 6 to 12 are cross sectional views of various modifications of the stay or wiper blade holder shown in FIGS. 4 and 5.

The wiper blade which is generally represented by numeral 10 and which constitutes the wiping element essentially comprises a leaf spring 11 and a moulded rubber ribbon 12 which is held in position by the leaf spring, as shown in cross section in FIG. 1. In the conventional wiper, the rubber ribbon 12 is constantly pressed against the surface of the windshield (not shown) by means of the leaf spring 11, but, when subjected to the lifting force resulting from the air stream caused as the vehicle advances at a high speed, is lifted from the surface of the windshield and is thus disabled to wipe the windshield properly.

The mechanism of the generation of such lifting force in the wiper blade is conjectured as follows. The rubber ribbon 12 is at all times subjected, at its upper portion 12a, to a stream of air flowing in the direction opposite to the direction in which the vehicle advances and, at its lower edge, 12b, is forced against the surface of the underlying windshield. From the aerodynamic point of view, it is considered that, in such condition, there exists a difference in velocity of air stream between the lower and upper portions of blade. According to the Bernoulli's law, this difference can be derived by the following equation:

$$\tfrac{1}{2}\rho V_1^2 + P_1 = \tfrac{1}{2}\rho V_2^2 + P_2 \qquad (1)$$

in which:

$\rho$ : density of air,
$V_1$: air stream velocity at the lower portion 12b,
$V_2$: air stream velocity at the upper portion 12a,
$P_1$: static pressure at the lower portion 12b, and
$P_2$: static pressure at the upper portion 12a.

In the equation (1), $V_1 < V_2$ since the velocity of the air stream is greater at the upper portion 12a of the rubber ribbon 12 than at the lower portion 12b, and thus $P_1 > P_2$. This pressure difference gives rise to the development of a lifting force in the rubber ribbon 12 in its entirety. Since this mechanism of the lifting force being generated is largely analogous to the case with a wing of a flying object, the lifting force may be approximated by the following equation:

$$L = \tfrac{1}{2} \rho \cdot C_L \cdot S \cdot V^2 \qquad (2)$$

in which $L$: lifting force acting on the rubber ribbon,
$C_L$: lift coefficient,
$S$: vertically projected area of the combination rubber ribbon and leaf spring, and
$V$: air stream velocity.

Here, the area $S$ in the shown example is the product of the width $W$ of the projection 12c and the length $l$ (FIG. 2) of the wiper blade.

The equation (2) will imply the fact that the lifting force $L$ which is the cause of the lifting of the wiper blade can be reduced if the projected area $S$ is reduced.

Thus, according to one important aspect of this invention, the lifting force exerted to the wiper blade can be significantly reduced by reducing the overall projected area S thereof, an embodiment being illustrated in FIGS. 2 and 3.

As shown, the wiper blade, which is now generally represented by numeral 13, is provided with stays or wiper blade holders 14 and 14' which are interconnected with each other by a driving arm 15 as customary, as best seen in FIG. 2.

In order to reduce the vertically projected area of the wiper blade, it is proposed by this invention to reduce the overall width of the wiper blade because the length $l$ of the blade (FIG. 1) depends on the size of the windshield to which the wiper blade is to be applied. For this purpose, the leaf spring which is now represented by numeral 15 is mounted on the upper face of the rubber ribbon which is represented by numeral 17, as clearly seen in FIG. 3. The rubber ribbon 17 is now void of the projection 12c of the wiper blade 10 of FIG. 1 so that the overall width of the wiper blade 13 is significantly reduced. The leaf spring 16 is preferably coextensive with the upper face of the rubber ribbon 17, as illustrated.

With the wiper blade thus arranged, the overall width $W'$ thereof may be of the order of about 4 mm, which is approximately one-half to one-third of the width of 8 to 12 mm of the conventional blades. Besides, the height of the wiper blade according to this invention may be preferably 7 to 8 mm, as compared with 10 to 16 mm of the conventional wiper blade.

The lifting of the wiper blade is caused when the lifting force becomes approximately equal to the force with which the wiper blade is pressed onto the windshield by a spring action, as previously noted. The vehicle speed providing such minimum lifting force will be known if the velocity of the air stream in the equation (2) is changed to the vehicle speed $Va$, thus:

$$Va = \sqrt{\dfrac{L}{\tfrac{1}{2}\cdot \rho \cdot C_L \cdot S}} \qquad (3)$$

wherein the vertically projected area of the wiper blade is assumed to be $S$.

If, on the other hand, the vertically projected area is reduced to one-half of S as the embodiment of FIGS. 2 and 3, then the vehicle speed providing the minimum lifting force $Vh$ will given by the equation:

$$Vh = \sqrt{\frac{L}{\frac{1}{2} \cdot \rho \cdot c_L \cdot \frac{s}{2}}} \qquad (4)$$

The ratio of $Va$ to $Vh$ is determined from the equations (3) and (4), as follows:

$$\frac{Va}{Vh} \frac{\sqrt{\dfrac{L}{\frac{1}{2} \cdot \rho \cdot c_L \cdot s}}}{\sqrt{\dfrac{L}{\frac{1}{2} \cdot \rho \cdot c_L \cdot \frac{s}{2}}}} = \frac{1}{\sqrt{2}} ; \qquad (5)$$

so that $Vh \doteq \sqrt{2}\, Va$

Thus if the projected area $S$ is reduced to one-half, then the vehicle speed resulting in the minimum force of lifting the wiper blade becomes $\sqrt{2}$ times higher and, if $S$ is reduced to one-third, the vehicle speed becomes $\sqrt{3}$ times higher.

In view of the fact that the usual wiper blades currently employed tends to be lifted from the windshield when the vehicle is driven at a velocity of about 100 km/hr, it is considered that the vehicle speed resulting in the minimum lifting force will be approximately equal to the maximum speed of the vehicle.

Thus, according to a first embodiment of the invention, the wiper blade can be prevented from floating over the surface of the windshield even when the vehicle is driven at an elevated speed, without impairing the wiping performance, mechanical strength and durability of the windshield wiper as a whole.

Now, in order to prevent the wiper blade from floating over the windshield when the vehicle is driven at a high speed, as previously noted, a fin is sometimes mounted on the stay or wiper blade holder so that a force directed toward the surface of the windshield is developed in the wiper blade whereby the lifting force exercised thereon is cancelled. The use of such a fin is, however, in some respects disadvantageous because of the previously described drawbacks.

Thus, according to a second important aspect of the invention, the stay or wiper blade holder is modified without affecting the occupant's vision through the windshield and the performance quality of the windshield wiper, so as to nevertheless reduce the lifting force exerted to the wiper blade when the vehicle is driven at a high speed, an embodiment realizing such a scheme being now illustrated in FIGS. 4 and 5.

Referring to FIGS. 4 and 5, the wiper blade which is now represented by numeral 13a has stays or wiper blade holders 14a and 14'a, a driving arm 15a connecting the stays or blade holders 14a and 14'a with each other, and a rubber ribbon 17a, similarly to the wiper blade of FIGS. 2 and 3. The wiper blade 13a of FIGS. 4 and 5 is shown to further have a reinforcing plate 18 which is secured to the top face of the rubber ribbon 17a. The stay or blade holder, 14a for instance, is connected to auxiliary stays 19 and 19' through a joint connection 20 (which may be a clevis) and the auxiliary stays 19 and 19', in turn, are secured to the reinforcing plate 18 through joint connections or clevises 21 and 21', respectively. The stay or wiper blade holder 14'a is also connected to the reinforcing plate 18 similarly to the stay or blade holder 14a, although not illustrated in FIG. 4.

The stays 19 and 19' are, when operative, oscillated on the windshield and are endowed with a force to press the rubber ribbon 17a unto the windshield by a spring action.

Each of the main stays 14a and 14'a and the auxiliary stays 19 and 19' (and also the auxiliary stays, not shown, of the main stay 14'a) is configured like an inverted letter V in cross section so as to form two opposite side walls 22 and 23, as clearly seen in FIG. 5.

With the wiper blade kept in contact with the surface of the windshield, the wiper blade is subjected to a stream of air flowing in a direction substantially perpendicular to the windshield and parallel to the wiper blade. When the stream of air passes through the wiper blade, it is deviated upwardly so that the lines of flow of the stream of air becomes denser over the wiper blade with a consequent drop in the pressure above the wiper blade. This causes a difference between the pressures above the wiper blade and near the lower portion of the rubber ribbon contacting the windshield, generating a lifting force which urges the wiper blade upwardly of the windshield. When the lifting force exceeds a predetermined level, then the wiper blade tends to float over the surface of the windshield and as a result can no longer wipe the windshield properly. Such lifting force is also generated when the stream of air which has been deviated upwardly strikes against the leeward side wall, shown by numeral 22. The relationship between the lifting force and the angle of the air stream with respect to the wiper blade is such that the lifting force is the greatest when the direction of the air stream is rectangular to the lengthwise direction of the wiper blade and is reduced as the angle between the direction of the airstream and the lengthwise direction of the wiper arm; the lifting force is the minimum when the direction of the air stream is parallel to the lengthwise direction of the wiper blade.

Thus, in a second embodiment of the wiper blade according to this invention, a plurality of holes 24 are formed in the leeward side wall 22 which is positioned behind the windward side wall 23 which is to be exposed direct to the stream of air when the vehicle is advancing, as illustrated in FIGS. 4 and 5.

When, now a stream of air flows in parallel to the windshield $S$ toward the rubber ribbon 17a and the stay, 14a in FIG. 5, in the direction of the arrow, then a lifting force L is generated for the reason previously noted. With the provision of the holes 24 in the leeward side wall 22, however, no difference between the pressures above and below the stay 14a so that no lifting force acts upon the stay. On the other hand, a vertical component $V$ of the force $P$ pressing the windward side wall 23 in the direction perpendicular thereto depresses the wiper blade downwardly so as to act to cancel the lifting force L exerted to the rubber ribbon 17a. The horizontal component H of the force P acts as a reaction. The lifting force acting upon the rubber ribbon is thus reduced and the wiper blade is prevented from floating over the windshield consequently. The force counteracting the lifting force can be increased by increasing the width of the windward side wall 23 so as to add to the effectiveness of preventing the wiper blade from lifting from the windshield, an example being illustrated in FIG. 6.

Referring to FIG. 6, the stay which is shown in cross section is made up of a leeward side wall 22a which has formed therein a plurality of punched holes 24a and a windward side wall 23a which is extended downwardly from its lengthwise edge to be greater in width than the opposite side wall 22a, whereby the force acting on the windward side wall 23a to cancel the lifting force acting upon the wiper blade can be significantly increased.

If desired, the windward side wall may be extended upwardly from the top edge of the stay as illustrated in FIG. 7, wherein the stay, which has a leeward side wall 22b having formed therein holes 24b, has a windward side wall 23b which extends past the top edge of the stay with the resultant increase in the width thereof.

FIG. 8 shows another modification of the stay, in which the leeward side wall 22c having formed therein holes 24c has its lengthwise edge portion 25 bent inwardly at a right angle, the leading edge portion 25 thus extending in parallel to the opposite windward side wall 23c. With the provision of such bent portion 25, the area confronting the stream of air is increased substantially similarly to the different stays shown previously so that the force counteracting the lifting force can be increased accordingly.

The lengthwise edge portion of the windward side wall may be bent outwardly, an example being shown in FIG. 9. As illustrated, the lengthwise edge portion 26 of the leeward side wall 22d (which has formed therein holes 24d) is bent outwardly to be parallel with the windward side wall 23d. Such outwardly bent edge portion 26 serves to add to the force acting against the lifting force, similarly to the edge portion 25 of the stay shown in FIG. 8, as will be readily appreciated.

In the stays illustrated in FIGS. 5 to 9, the holes 24a to 24d are punched out in the leeward side walls but, if desired, the holes may be formed by bending limited sections outwardly or inwardly, examples being shown in FIGS. 10 to 12.

Referring to FIG. 10, the sections 27 in the leeward side wall 22e are bent, together with the lengthwise edge portion, inwardly of the stay to be parallel with the opposite windward side wall 23e, whereby holes 24e are formed in the leeward side wall. The thus bent sections 27 serve entirely similarly to the bent edge portions 25 and 26 of the stays illustrated in FIGS. 8 and 9, respectively.

FIG. 11 illustrates a modification of the stay illustrated in FIG. 10, wherein sections 28 of the leeward side wall 22f are bent, together with the lengthwise edge portion, outwardly to be parallel with the opposite windward side wall 23f whereby holes 24f are formed therein.

FIG. 12 shows a further modification of the stay in which sections 29 of the leeward side wall 22g are bent inwardly (or outwardly, though not shown) to be parallel with the opposite windward side wall 23g with the lengthwise edge portion 30 left unbent, whereby holes 24f are formed in the leeward side wall.

The holes in the leeward side wall of the stay may be shaped suitably insofar as a stream of air is freely passed therethrough and the mechanical strength of the stay per se is not impaired.

The angle $\theta$ which is made by the opposite side walls, 22 and 23 in FIG. 5, should be as large as possible for the purpose of increasing the vertical component $V$ of the force $P$ which counteracts the lifting force, though it largely depends upon the type and general configuration of the vehicle, the shape and inclination of the windshield, and the shape and size of the rubber ribbon, because the direction of the air stream is affected by all these variables. Experiments conducted by us have revealed that the angle between the two side walls is advantageous in the range of 70° to 120°.

What is claimed is:

1. In a wiper blade of a windshield wiper of a vehicle, including a rubber ribbon kept in slidable contact with the windshield, a leaf spring mounted on said rubber ribbon for holding the same, two pairs of auxiliary stays each pair of which is connected at its extending ends to said leaf spring, a pair of main stays connected at its extending ends to said two pairs of auxiliary stays, each of said main and auxiliary stays being connected at its inner ends to each other and being inverted V-shaped cross section to form two opposed windward and leeward side walls, each pair of said main and auxiliary stays being angled at its connection for having a spring action to press said rubber ribbon through said leaf spring against the windshield, and a driving arm swingably connected to the connection of said main stays for effecting swinging movement of the wiper blade as a whole on the windshield, the improvement comprising a plurality of holes formed in the leeward side walls of said main and auxiliary stays and arranged in the longitudinal direction thereof in a manner so as to occupy the major areas thereof for effecting free escape therethrough of a stray air of relatively higher static pressure which may be confined during the running operation of the vehicle in a space defined by said windward and leeward side walls, thereby minimizing lifting force to be exerted to said main and auxiliary stays due to said stray air.

2. An improved wiper blade according to claim 1, wherein said leaf spring is coextensive with the upper surface of said rubber ribbon.

3. An improved wiper blade according to claim 1, wherein said holes are prepared by punching said leeward side wall.

4. An improved wiper blade according to claim 3, wherein said windward side wall is formed to extend downwardly from its longitudinal edge and has greater width than said leeward side wall.

5. An improved wiper blade according to claim 3, wherein said windward side wall is formed to extend upwardly from its top edge and has a greater width than said leeward side wall.

6. An improved wiper blade according to claim 3, wherein said leeward side wall has a longitudinal edge portion bent inwardly substantially at a right angle and in parallel with said windward side wall.

7. An improved wiper blade according to claim 3, wherein said leeward side wall has a longitudinal edge portion bent outwardly substantially at right angle and is parallel with said windward side wall.

8. An improved wiper blade according to claim 3, wherein said holes are formed with sections bent inwardly together with the longitudinal edge portion of said leeward side wall substantially being parallel with said windward side wall.

9. An improved wiper blade according to claim 3, wherein said holes are formed with sections bent outwardly together with the longitudinal edge portion of said leeward side wall substantially being parallel with said windward side wall.

10. An improved wiper blade according to claim 3, wherein said holes are formed with sections bent inwardly substantially at a right angle and parallel with said windward side wall.

11. An improved wiper blade according to claim 3, wherein said holes are formed with sections bent outwardly substantially at a right angle and parallel with said windward side wall.

* * * * *